United States Patent [19]
Kelly et al.

[11] Patent Number: 5,913,424
[45] Date of Patent: Jun. 22, 1999

[54] STORAGE AND DISPLAY TRAYS

[75] Inventors: Daniel E. Kelly, Brookfield; Ted Lemke, Port Washington, both of Wis.

[73] Assignee: Tulip Corporation, Milwaukee, Wis.

[21] Appl. No.: 08/091,894

[22] Filed: Jul. 14, 1993

[51] Int. Cl.⁶ .................................................. B65D 21/00
[52] U.S. Cl. ........................... 206/509; 206/511; 220/509
[58] Field of Search ............................. 220/809; 206/509, 206/511

[56] References Cited

U.S. PATENT DOCUMENTS

| | | |
|---|---|---|
| D. 329,932 | 9/1992 | Apps . |
| 4,344,530 | 8/1982 | deLarosiere . |
| 4,410,099 | 10/1983 | deLarosiere . |
| 4,700,836 | 10/1987 | Hammett . |
| 4,899,874 | 2/1990 | Apps et al. . |
| 4,944,400 | 7/1990 | Van Onstein et al. .................. 206/511 |
| 5,184,748 | 2/1993 | Apps . |

*Primary Examiner*—Joseph M. Moy
*Attorney, Agent, or Firm*—Foley & Lardner

[57] ABSTRACT

A stackable reusable storage and display tray for bottles or cans having labels on the outer surface thereof, the tray including a plastic bottom having end walls and side wall molded as an integral tray, the side walls and end wall being formed by posts or pillars equally spaced around the perimeter of the bottom wall and forming openings in alignment with the longitudinal and lateral rows of bottles or cans, the pillars being located to support the trays in stacked position and being nestable by inverting one of the trays and inserting it into another of said trays for storage.

4 Claims, 3 Drawing Sheets

STORAGE AND DISPLAY TRAYS

FIELD OF THE INVENTION

This invention generally relates to reusable storage trays of the type which are adapted to hold soda bottles or cans and, more particularly, to a molded plastic tray which can be nested in pairs for storage and having openings around the perimeter thereof to expose the labels of the products stored therein.

BACKGROUND OF THE INVENTION

The trays of the type contemplated herein generally provide for the storage and transportation of 24 bottles or cans. The trays are normally provided with side walls and end walls to enclose the tray with the labels of the cans or bottles stored in the trays hidden from view. The cans or bottles must be removed from the trays and stacked on counters for viewing by the customer. The trays when stacked for storage take up as much space as when filled with cans or bottles.

SUMMARY OF THE PRESENT INVENTION

The present invention relates to a reusable tray for storing and transporting bottles or cans which allows for the exposure of the labels to the prospective purchaser by including a series of U-shaped openings in the side walls and end walls of the tray. The openings being aligned with the longitudinal and lateral rows of bottles or cans. The side walls and end walls are reduced in size whereby the trays can be nested in pairs for storage. When the trays are stacked on the top of the bottles or containers an open space provided between the trays further exposing the labels to the customer. The trays when empty are nested in pairs and stacked one on top of the other thereby reducing the amount of space required for storage. The end walls are advantageously provided with recessed handles which allow the trays to be aligned in close proximity with respect to adjoining trays. The bottom of the tray is provided with patterned members which are recessed on the bottom in order to align the trays on the tops of the cans or bottles.

Other principal features and advantages of the invention will become apparent to those skilled in the art upon review of the following drawings, the detailed description and the appended claims.

Figure 1:
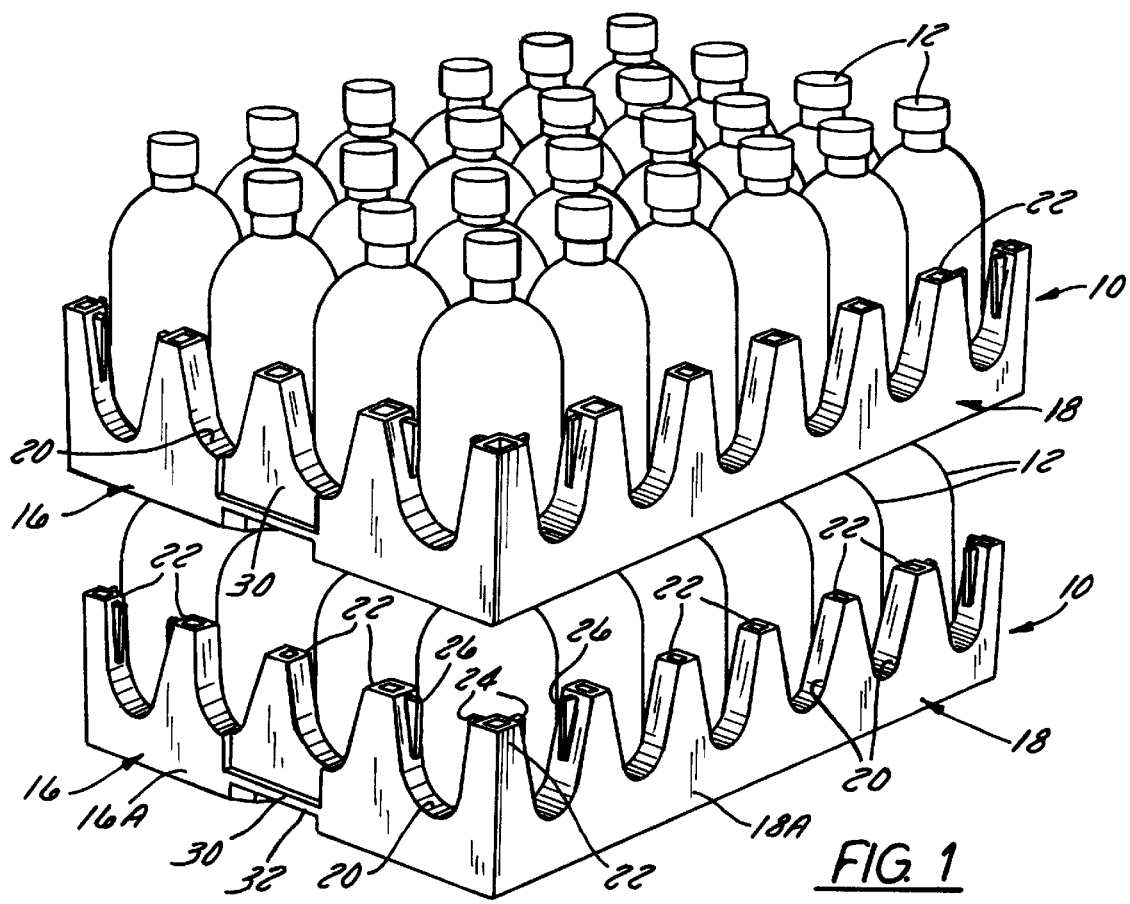
FIG. 1 is a perspective view of two of the trays showing one of the trays stacked on the top of the bottles in the other tray.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

An exemplary embodiment of one of the trays 10 according to the present inventions is shown in FIG. 1 wherein each tray is designed to hold twenty-four bottles or cans 12 in each tray. The upper tray 10 is shown mounted on the tops of the bottles 12 in the lower tray 10. It should be noted that there is a space 14 between the upper tray and the lower tray which allows for a purchaser to recognize the label or product displayed in the space between the trays.

More significantly, each tray generally includes a bottom panel 14, a pair of end walls 16, and a pair of side walls 18. Each end wall 16 includes an outer wall 16A and an inner wall 16B. Each side wall 18 includes an outer wall 18A and an inner wall 18B. The end walls and the side walls are provided with openings 20 which are aligned with and correspond to the rows of bottles or cans, thus exposing the label on the bottles or cans on all sides of the tray to the purchasing public. The openings 20 are generally U-shaped to define five-sided, tapered pillars or posts 22 to retain the bottles or cans in the tray. When the trays are turned upside down the tapered pillars 22 which are open at the top form funnels that can be quickly and easily rinsed to clean the trays.

Figure 2:
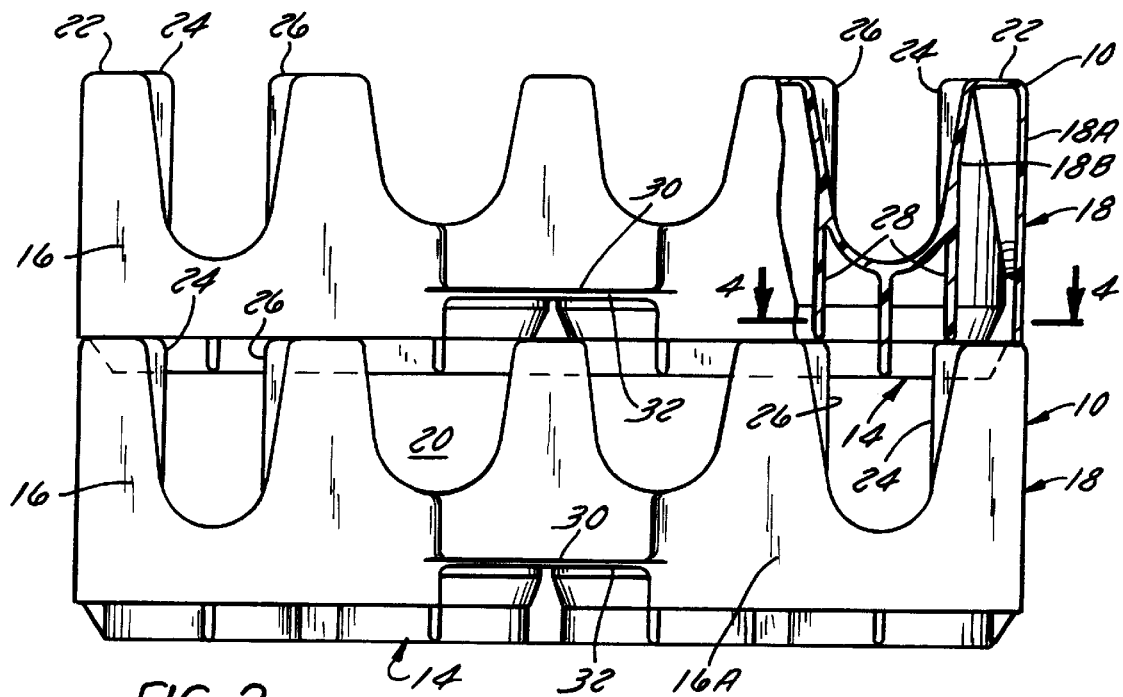
FIG. 2 is an end view partly in section showing one of the trays stacked on the lower tray.
Figure 3:
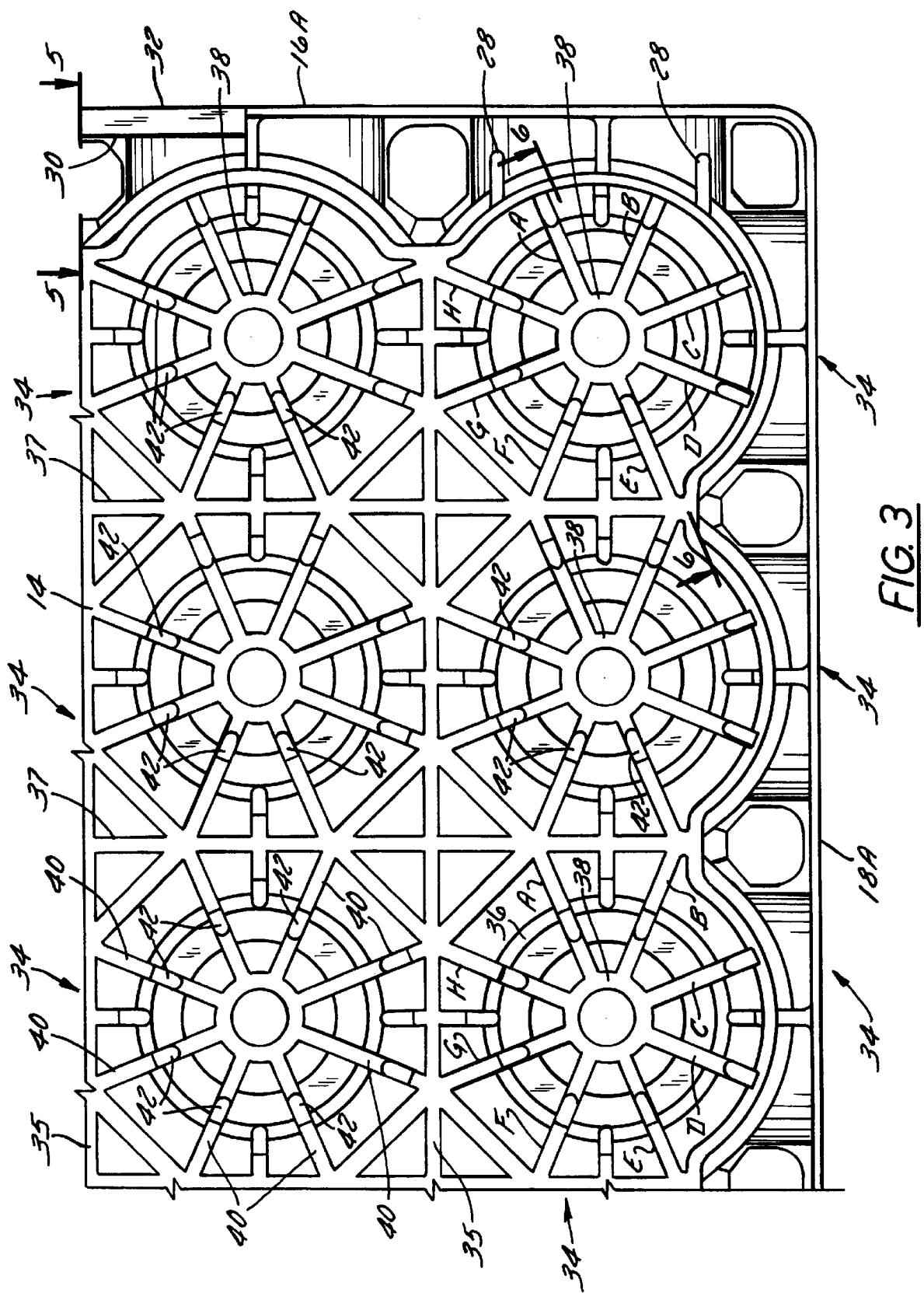
FIG. 3 is a view of one corner quadrant of the bottom of one of the trays.
Figure 4:
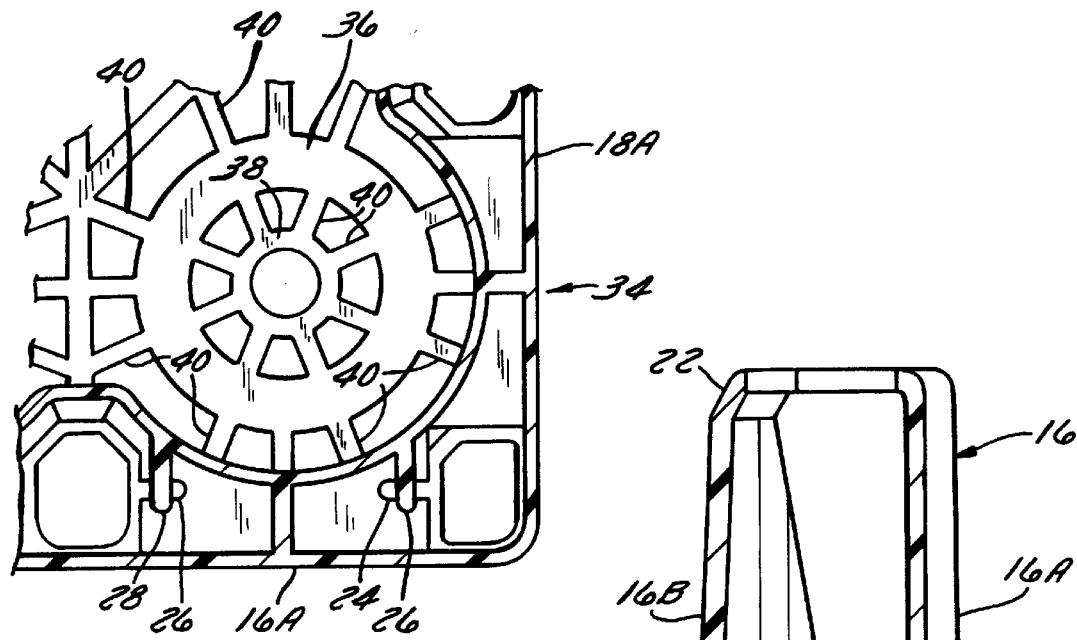
FIG. 4 is a view taken on line 4—4 of FIG. 2 showing the alignment of the supporting flanges on the upper tray with the flanges on the lower tray.

Referring to FIG. 2, two of the trays are shown stacked one on top of the other with the upper tray resting on the lower tray. The upper tray may be filled with one or more bottles while the lower tray is empty. Normally the end walls 16A and side walls 18A on the upper tray should rest on the top of the corresponding walls on the lower tray. In the event the side walls and end walls are misaligned the upper tray may tip slightly due to misalignment of the side and end walls. In order to prevent misalignment of the trays each corner pillar 22 includes a flange 24 on the end wall side of the pillar and each adjacent pillar in the end wall to the corner pillars includes a flange 26. Referring to FIGS. 2, 3 and 4, it should be noted that flanges 28 are also provided on the bottom of the pillars which are located at right angles to the flanges 24 and 26 on the pillars 22. When the trays are stacked the flanges 28 on the bottom of the upper tray will seat on flanges 24 and 26 on the lower tray preventing collapse or misalignment of the upper tray on the lower tray.

Figure 5:
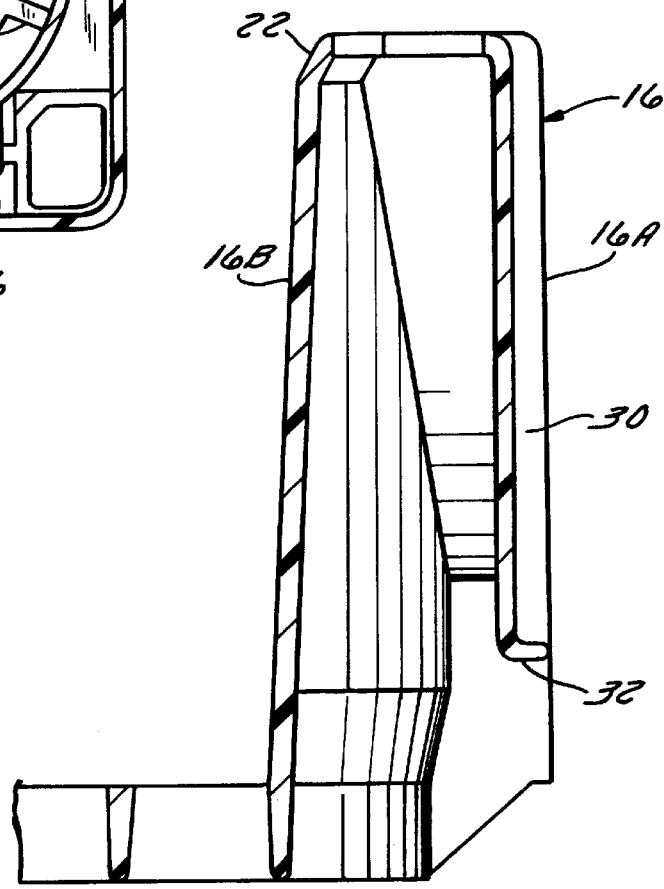
FIG. 5 is a view taken on line 5—5 of FIG. 3 showing a cross section of one of the recessed handles.

The trays are transported by means of handles 30 formed in the end walls 16A of each of the trays as shown in FIGS. 1 and 5. Referring to FIG. 5, the handle 30 is provided with a lip 32 which is spaced upward from the bottom of the tray to allow for grasping the handle to lift the tray. The handle is also located inwardly from the face of the side wall so that the handle does not obstruct or interfere with the alignment of adjacent trays on either end of the tray end-to-end.

Figure 6:
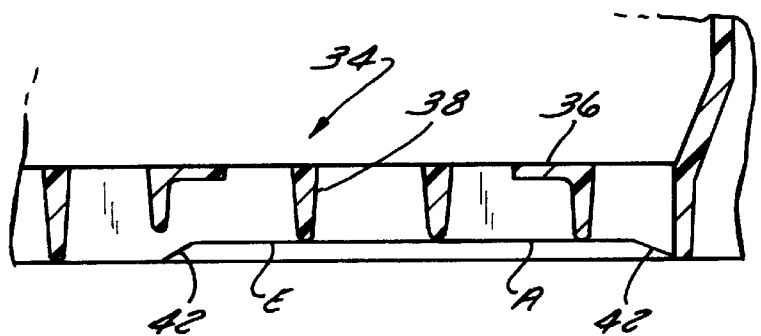
FIG. 6 is a view taken on line 6—6 of FIG. 3 showing the recess in the bottom of the pattern.

The bottom wall 14 of the tray as shown in FIGS. 3, 4 and 6 is made up of a number of patterned members or squares 34 corresponding to the number of bottles or cans to be carried in the tray. The squares 34 are defined by longitudinal ribs 35 and lateral ribs 37 which define 3 by 2 bottle support squares 34. Each patterned square 34 as shown in FIGS. 3 and 6 includes a circular support 36 having a flat top surface for supporting the cans or bottles, particularly one piece petaloid bottles. Each patterned member 34 also includes an inner circular member 38 and eight radial members 40 radiating outwardly at equally spaced intervals around the circular member 38 and circular support 36. The top surface of each of the radial members 40 and circular member 38 lies in the same plane of the top surface of support 36. Each of the radial members also has a number of cam surfaces 42 on the bottom which center the tray on the bottle or can tops.

In this regard and referring to the corner patterned member 34 in FIG. 3, the eight radial members A, B, C, D, E, F, G and H are shown radiating outwardly from member 38. Each of the radial members E, F, G and H in the corner pattern includes a camming surface 42 arranged in a semi-circle around member 38. Each of the patterned members adjacent to the corner patterned member have a corresponding radial configuration with the same arrangement of camming surfaces 42 as provided in the corner patterned member 34. The two patterned members 34 on the inner end of the panel section shown in FIG. 3 also have eight radial members with camming surfaces 42 located on six of the radial members A, B, E, F, G and H. These camming surfaces 42 are arranged to center the tray on the bottle tops so that the upper tray remains aligned with the lower tray.

The trays are nested for storage by inverting an upper tray and inserting it into a lower tray. The end walls and side walls will be offset, however the height of the two trays will be reduced to the height of the lower tray and the thickness of the bottom of the nested tray. With this arrangement, the overall height of a stack of trays is reduced, thus increasing the truck load capacity.

Thus, it should be apparent that there has been provided in accordance with the present invention storage and display trays that fully satisfy the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

We claim:

1. A reusable, stackable and nestable display tray for labeled containers, said tray comprising a rectangular bottom wall defining a supporting surface for the containers, a side wall formed integrally with each end of said bottom wall, an end wall formed integrally with each side of said bottom wall, each end wall and side wall including a number of hollow pillars equally spaced around the perimeter of said bottom wall, said pillars forming U-shaped openings aligned with the rows of containers to expose a substantial portion of the containers and wherein said bottom wall is divided into four rectangular sections, each section having six patterned support surfaces for the containers wherein said hollow pillars are formed with multiple sides tapered to form a spout having an opening at the top cleaning fluid from the tray when the tray is inverted for cleaning.

2. The tray according to claim 1 wherein said pillars terminate midway between the height of the containers.

3. The tray according to claim 1 wherein each said patterned support surface includes a circular ring supported by a number of radial members.

4. The tray according to claim 1 wherein said tapered pillars are arranged to support an inverted tray nested in the top of another tray.

\* \* \* \* \*